United States Patent
Masuda et al.

(10) Patent No.: US 6,501,712 B1
(45) Date of Patent: Dec. 31, 2002

(54) DISC IDENTIFYING METHOD AND DEVICE

(75) Inventors: Eiji Masuda, Ehime (JP); Takanobu Minami, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/445,830

(22) PCT Filed: Apr. 9, 1999

(86) PCT No.: PCT/JP99/01891

§ 371 (c)(1),
(2), (4) Date: Mar. 16, 2000

(87) PCT Pub. No.: WO99/53492

PCT Pub. Date: Oct. 21, 1999

(30) Foreign Application Priority Data

Apr. 14, 1998 (JP) ............................................. 10-102335

(51) Int. Cl.[7] ................................................. G11B 7/00
(52) U.S. Cl. ..................................................... 369/44.27
(58) Field of Search ....................... 369/94, 55.2, 55.23, 369/55.22, 44.27, 44.23, 53.37

(56) References Cited

U.S. PATENT DOCUMENTS

| | | | | | |
|---|---|---|---|---|---|
| 5,859,822 | A | * | 1/1999 | Inoue et al. | 369/53.22 |
| 6,021,102 | A | * | 2/2000 | Seto et al. | 369/44.27 |
| 6,262,957 | B1 | * | 7/2001 | Inoue et al. | 369/53.22 |
| 6,295,260 | B1 | * | 9/2001 | Shihara et al. | 369/53.2 |

FOREIGN PATENT DOCUMENTS

| | | |
|---|---|---|
| JP | 9-106617 | 4/1997 |
| JP | 9-161387 | 6/1997 |
| JP | 9-204683 | 8/1997 |
| JP | 9-282783 | 10/1997 |
| JP | 10-64180 | 3/1998 |
| JP | 10-106023 | 4/1998 |
| JP | 10-255274 | 9/1998 |
| JP | 10-340472 | 12/1998 |
| JP | 11-66712 | 3/1999 |

* cited by examiner

*Primary Examiner*—William Korzuch
*Assistant Examiner*—Kimlien Thi Le
(74) *Attorney, Agent, or Firm*—Wenderoth, Lind & Ponack, L.L.P.

(57) ABSTRACT

With an optical disc device for reproducing information from discs having a recording density different from one another, by means of laser light beams each having a wavelength different from one another, a provision is put in place to prevent data stored on a CD-R disc from being damaged by irradiating a short wavelength laser beam. A method for identifying discs disclosed by the present invention is to find out whether or not a disc in question is CD-R and the like by irradiating long wavelength laser light on the disc while the rotation of the disc is suspended, and otherwise to find out whether or not a disc is DVD and the like by irradiating short wavelength laser light on the disc. Shifting a focusing lens in the light irradiating axis direction of laser light by means of an actuator generates a focus error signal and an all light amount sum signal, the amplitudes of which enable the identification of discs.

8 Claims, 7 Drawing Sheets

DISC IDENTIFYING METHOD AND DEVICE

FIELD OF THE INVENTION

The present invention relates to a method for identifying discs used in an optical disc device for recording/reproducing information on a variety of optical discs, each of which has a recording density different from one another, by irradiating laser beams of different wavelengths.

BACKGROUND OF THE INVENTION

There has been existing an optical disc device whereby information is reproduced from such optical discs as CD, CD-R, CD-RW and the like by using a long wavelength (780 nm) laser beam and also information is allowed to be reproduced from optical discs such as DVD-5 and DVD-9, each of which has a recording density higher than the ones of the foregoing optical discs, by using a short wavelength (650 nm) laser beam.

However, there is a danger that the recording film of an organic pigment base as used with such optical discs as CD-R and the like may be destroyed when a laser beam with a short wavelength of 650 nm is employed. for reproduction of information from the optical discs. It is necessary to take a sufficient countermeasure to prevent the destruction of the recording film from occurring in order to cope with the foregoing problem and a highly accurate method for identifying discs is needed to deal with the above issue.

DISCLOSURE OF THE INVENTION

With an optical disc unit comprising: a first light source radiating a light beam with a first wavelength for reproducing information from a first optical disc; a second light source radiating a light beam with a wavelength shorter than the first wavelength for reproducing information from a second optical disc having a higher recording density than the recording density of the first optical disc; a convergent device operable to have the light beam of the first wavelength and the light beam of the second wavelength converge on the optical disc, respectively; and a light receiving device operable to receive reflective light from the first optical disc and reflective light from the second optical disc, the present invention provides a method for identifying discs comprising: irradiating the light beam of the first wavelength on the optical disc while the rotation of the optical disc being suspended; recognizing the existence of the first optical disc according to a signal received from the light receiving device when the focus lens of the convergent device is moved in the light irradiating axis direction to the optical disc; irradiating the light beam of the second wavelength on the optical disc while the rotation of the optical disc still being suspended when no existence of the first optical disc is recognized; and recognizing the existence of the second optical disc according to a signal received from the light receiving device when the focusing lens of the convergent device is moved in the light irradiating axis direction to the optical disc.

Thus, the destruction of the previously recorded information caused by irradiating a short wavelength (650 nm) laser beam on a CD-R disc that belongs to the first optical disc can be prevented from taking place.

Further, applying some modification to the foregoing method, when no existence of the first optical disc is recognized upon irradiating the light beam of the first wavelength, a signal received from the light receiving device is memorized and, in succession, the light beam of the second wavelength is irradiated, thereby having the existence of the second disc recognized by a signal received from the light receiving device and then having the foregoing signal memorized. By comparing the values of these two memorized signals, a reconfirmation of countermeasures against a malfunction becomes possible.

The foregoing method allows the CD-R disc belonging to the first optical disc to be identified again even when wrong identification has been made upon irradiating the light beam of the first wavelength, thereby achieving a further enhancement in reliability.

DETAILED DESCRIPTION OF PREFERRED EMBODIMENTS

Figure 1:
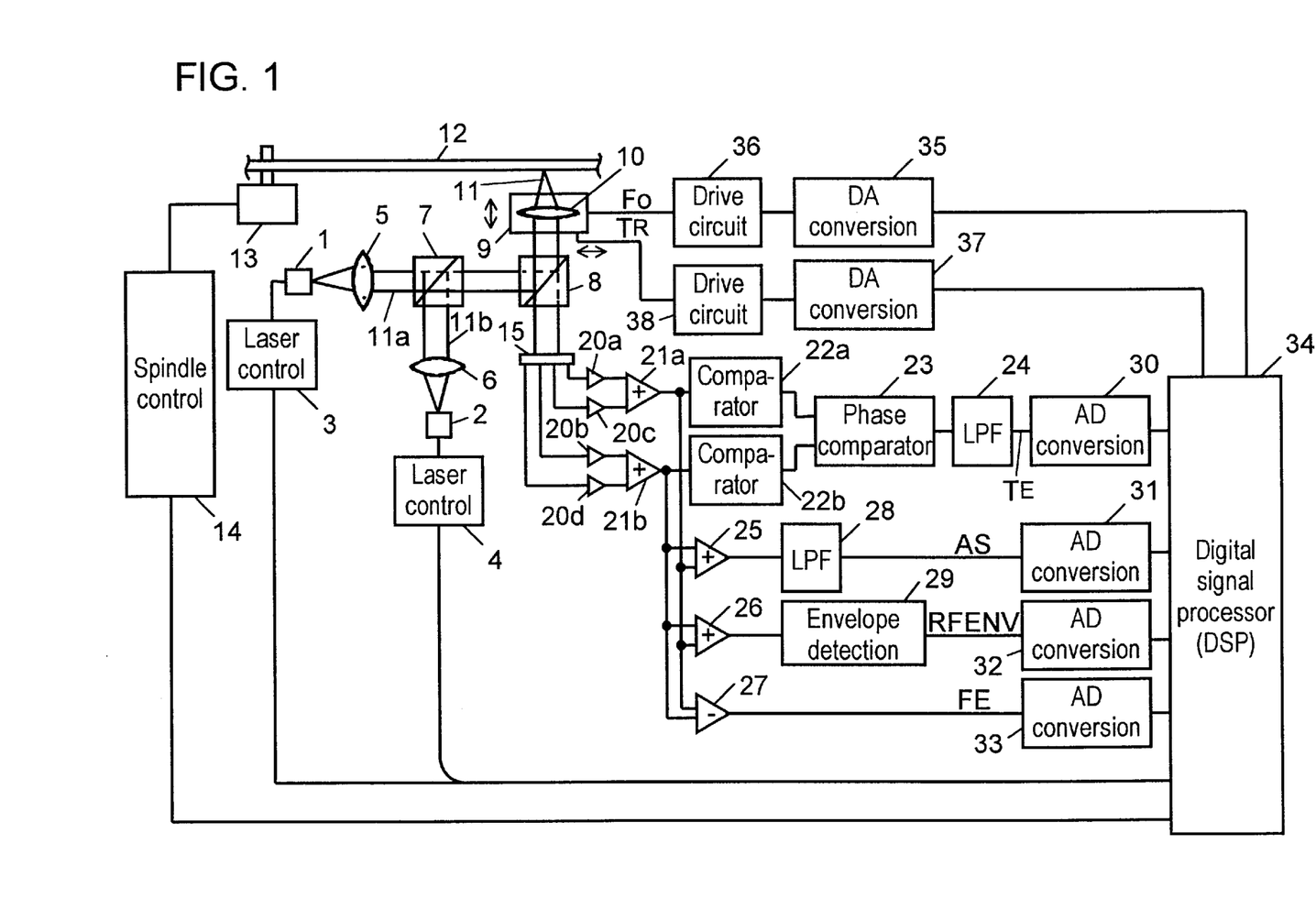
FIG. 1 is a block diagram of an optical disc unit employing a method for identifying discs in an exemplary embodiment of the present invention.

Next, a detailed description is given to an exemplary embodiment of the present invention with reference to drawings. FIG. 1 is a block diagram of an optical disc device, which has two light sources with each respective wavelength differing from the other and is intended for reproducing information from two or more kinds of discs such as CD, CD-R and DVD, having a recording density different from each other.

An optical disc unit has a laser light source 1 irradiating a long wavelength light beam 11a on an optical disc 12, a coupling lens 5 to make the emitted light from the light source 1 a collimated light beam, a coupling lens 6 to make the emitted light from the light source 2 a collimated light beam, a wavelength dependent polarizing element 7, a polarizing beam splitter 8 and an actuator 9 to move a focusing lens 10 in the irradiating direction of laser beams. The optical disc unit also has a laser control circuit 3 to control the laser light source 1 and a laser control circuit 4 to control the laser light source 2. The laser light sources 1 and 2 are controlled by the signals received from a digital signal processor 34 via the laser control circuits 3 and 4.

The light beam from the laser light source 1 is collimated by the coupling lens 5. Then, the collimated light passes through the wavelength dependent polarizing element 7 and the polarizing beam splitter 8, and converges onto an optical disc 12 as a light beam spot through the focusing lens 10 that is moved in the focusing and tracking direction by the actuator 9.

Figure 2:
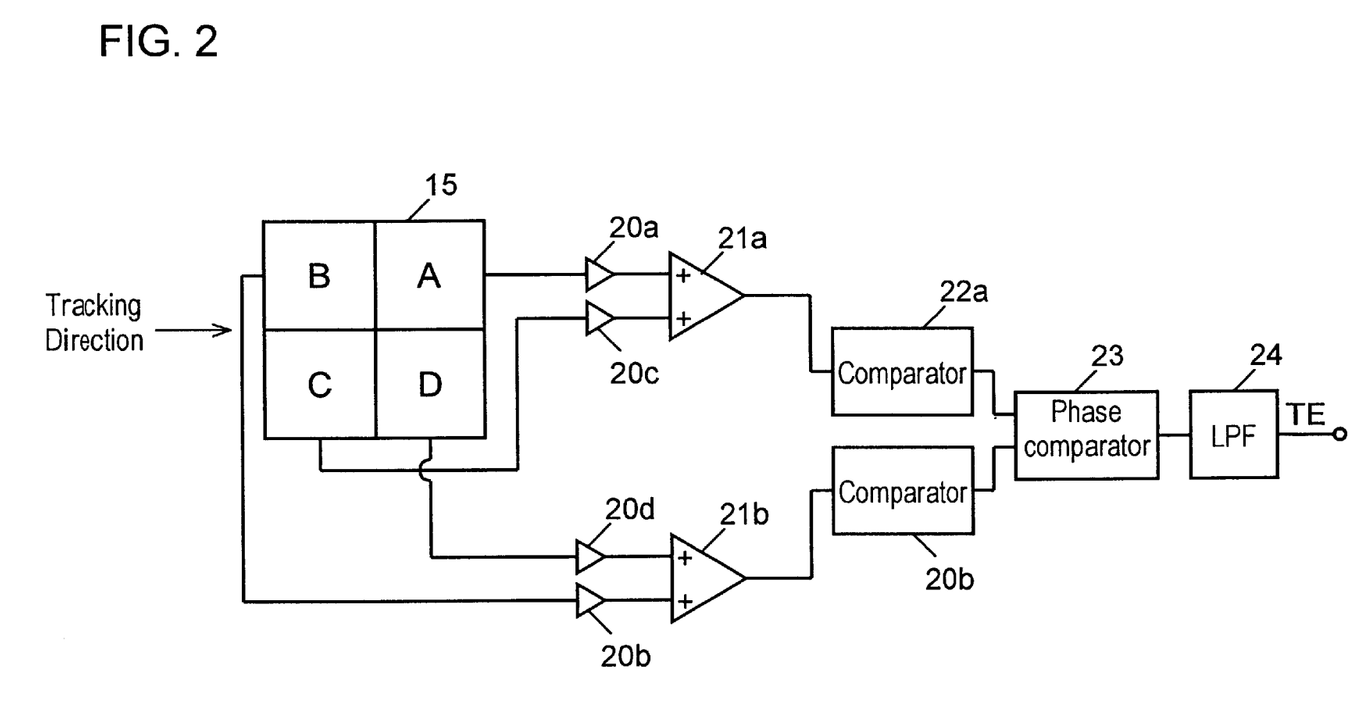
FIG. 2 is a detailed block diagram of the photo detector used in the optical disc unit of FIG. 1.

Similarly, the light beam from the laser light source 2 is collimated by the coupling lens 6. Then, the collimated light passes through the wave-length dependent polarizing element 7 and the polarizing beam splitter 8, and converges onto the optical disc 12 as a light beam spot through the focusing lens 10 that is moved in the focusing and tracking direction by the actuator 9. These light beams are used selectively according to the kinds of discs loaded in the optical disc device., Th reflected light from the optical disc 12 passes through the focusing lens 10 and the polarizing beam splitter 8 and is incident on a four element split photo detector 15. The four element split photo detector 15 has a split structure as shown in FIG. 2. Signals from the photo detector 15 pass through current-voltage conversion amplifiers 20a, 20b, 20c and 20d, and diagonal sum signals of A to D are generated at adders 21a and 21b, and the difference signals of adders 21a and 21b are generated at a differential amplifier 27, thus formulating an astigmatic method and gaining a focus error signal FE. Further, each respective diagonal sum signal of the foregoing is turned to binary form at comparators 22a and 22b, and the phases of the resulting binary signals are compared at a phase comparator 23, an from which is passed through a low pass filter 24 to have noise eliminated, thereby obtaining a phase differential tracking signal TE.

Furthermore, the entire amount of light from each respective detector element A to D of the four element split photo detector 15 is received at an adder 25, an output signal from which is passed through a low pass filter 28, thereby generating an all light amount sum signal AS. Similarly, the entire amount is received at an adder 26, a signal from which is envelope detected, thereby generating a RF envelope detector signal RFENV.

Each respective signal thus generated is fed into a digital signal processor (DSP) 34. The DSP 34 executes a digital filter operation of addition, delay and multiplication with the focus error signal FE and the tracking error signal TE inputted, thereby performing low-frequency gain compensation for focusing and tracking, respectively, and also phase compensation in the vicinity of a gain crossing point. A focus control signal is applied to a drive circuit 36 via a DA converter 35.

The drive circuit 36 amplifies the current of focus control signal fed from the DA converter 35 and outputs the amplified signal to the actuator 9 to drive the focusing lens 10, thereby realizing the focus control. A tracking control signal is applied to a drive circuit 38 via a DA converter 37. The drive circuit 38 amplifies the current of tracking control signal fed from the DA converter 37 and outputs the tracking control signal to the actuator 9 to drive the focusing lens 10, thereby realizing the tracking control.

Figure 4:
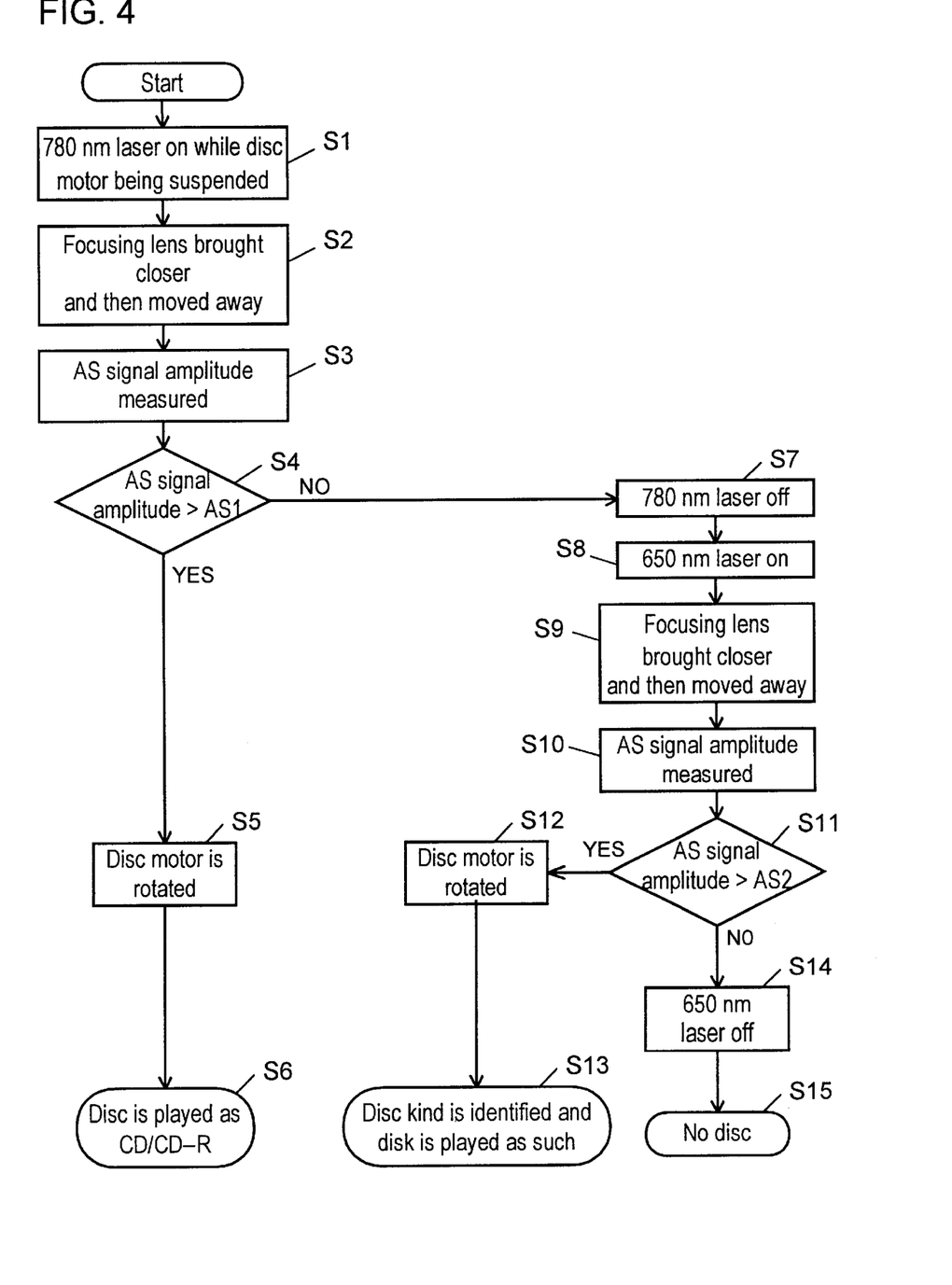
FIG. 4 is a flow chart for a case where an all light amount sum signal AS is used in identifying discs in an exemplary embodiment of the present invention.
Figure 5:
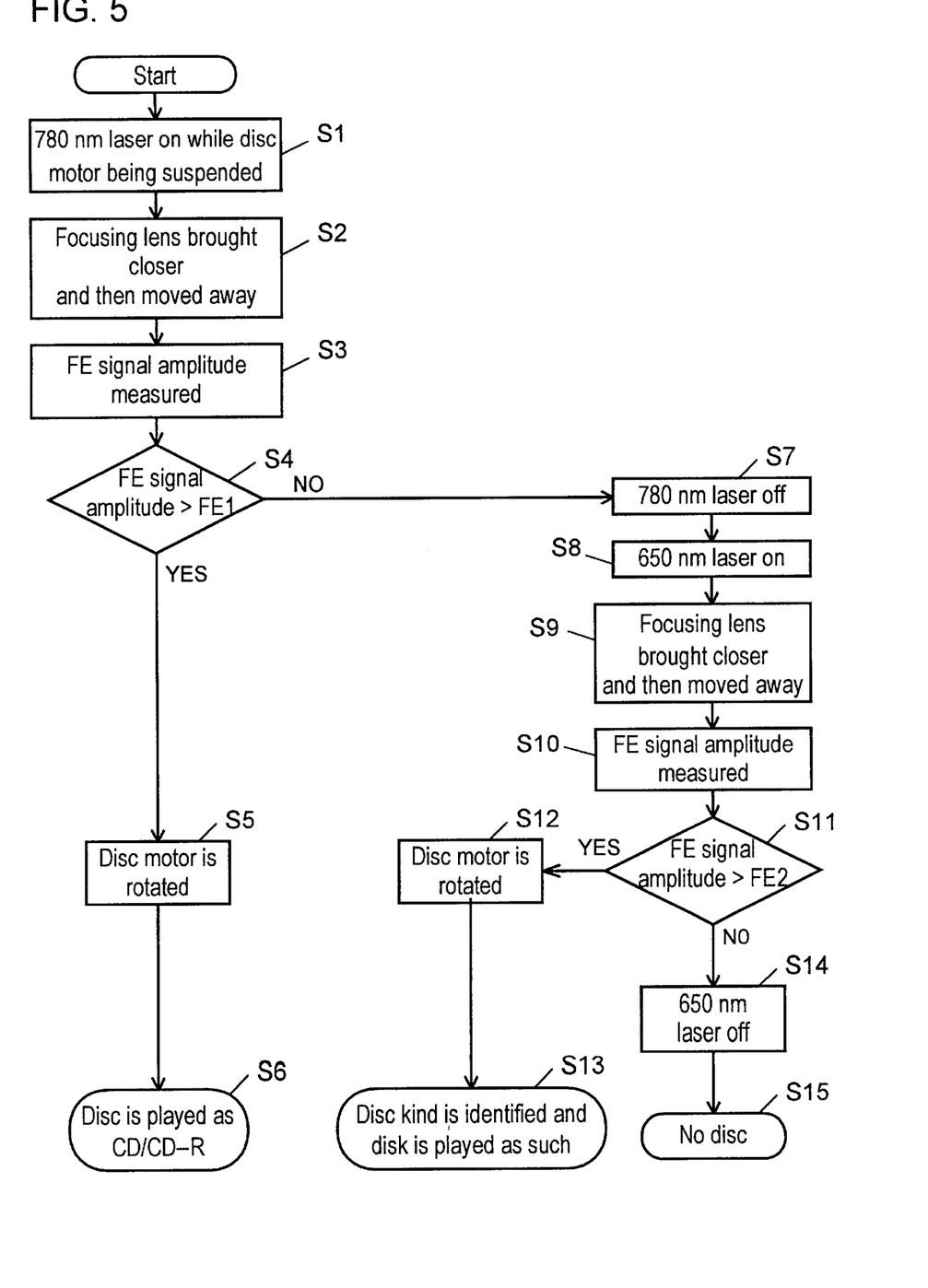
FIG. 5 is a flow chart for a case where a focus error signal FE is used in identifying discs in an exemplary embodiment of the present invention

With the optical disc device structured as described in the above and at the time of starting the optical disc device, in which such optical discs as CD, CD-R and CD-RW, and such optical discs as one layer structured DVD-5 having a higher recording density and two layer structured DVD-9 having a larger recording capacity are used, a concrete description is given to a method for identifying the optical discs with reference to flow charts of FIG. 4 and FIG. 5. FIG. 4 is a flow chart of an identifying method using the all light amount sum signal AS and FIG. 5 is a flow chart of an identifying method using the focus error signal FE. Any method of the foregoing two methods is allowed to be employed.

Figure 3:
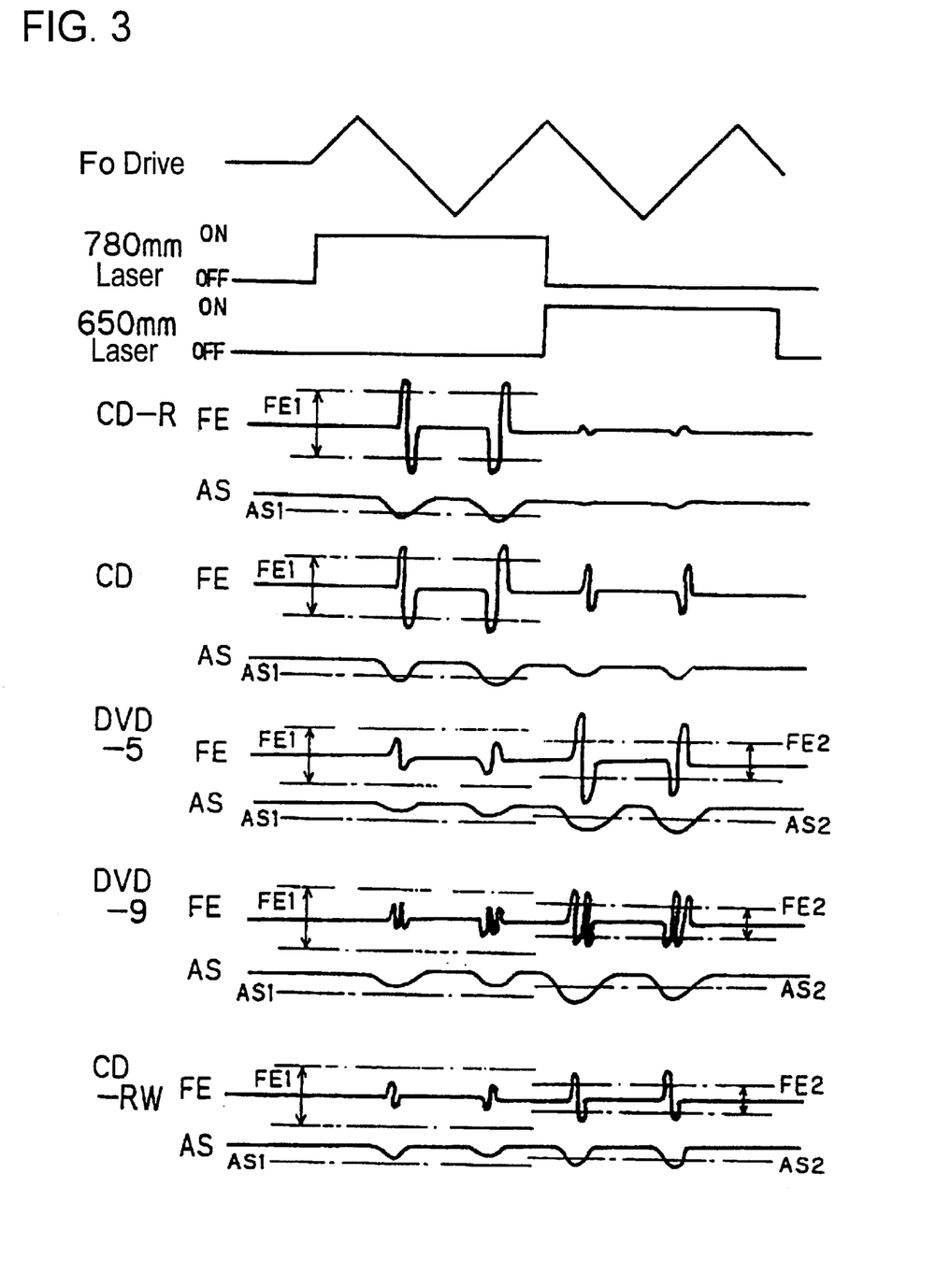
FIG. 3 shows waveforms of various signals generated upon irradiating laser beams with different wavelengths on a variety of discs in the optical disc unit of FIG. 1.

In addition, FIG. 3 is a signal waveform diagram showing waveforms of the signals FE and AS and also a focus drive signal Fo of the actuator 9 that are obtained when, while the rotation of various kinds of discs being suspended, laser of 780 nm or 650 nm is turned on, respectively, and the focusing lens 10 is brought closer to and then moved away from the disc loaded by means of the actuator 9.

First, at S1 step, while the rotation of the disc being suspended, a signal is sent from the DSP 34 to the laser control circuit 3 to make the laser light source 1 of long wavelength (780 nm) emit light.

Next, at S2 step, the focusing lens 10 is brought closer to and then moved away from the disc 12. At this time, if the unit is loaded with CD or CD-R, the AS signal amplitude and FE signal amplitude become larger, respectively, than predetermined values AS1 and F1, by which the optical disc loaded is recognized as CD or CD-R as shown in FIG. 3. (Steps S3 and S4) As a result, the DSP 34 arrives at a conclusion that the optical disc 12 loaded in the device is CD, CD-R or the like and rotates the disc, putting the optical disc device in operation. (Steps S5 and S6)

In a case where the AS signal amplitude and FE signal amplitude are smaller than the predetermined values AS1 and FE1, respectively, the DSP 34 arrives at a conclusion that the optical disc 12 loaded is not CD nor CD-R, and has the focusing lens 10 moved to the lowest position and then feeds an OFF signal to the laser drive circuit 3 and an ON signal to the laser drive circuit 4, thereby shutting off the laser light source 1 of long wavelength (780 nm) and making the laser light source 2 of short wavelength (650 nm) emit light. (Step S8)

Under this condition, the focusing lens 10 is again brought closer to and then moved away from the disc (Step S9) and a comparison is made between the AS signal amplitude or FE signal amplitude and the predetermined values AS2 or FE2, respectively, the predetermined values AS2 and FE2 providing the criteria, whereby the optical disc is judged as DVD-5 or DVD-9. (Step S11)

When the AS signal amplitude or FE signal amplitude is found out to be larger than the predetermined values AS2 or FE2, respectively, the DSP 34 judges that the disc loaded is a disc other than CD/CD-R and rotates the disc motor 13 to proceed further with a process of determining kinds of the disc loaded, and then allows the optical disc device to be operated. (Steps S12 and S13)

When the respective signal level is smaller than the predetermined values FE2 or AS2, the DSP 34 judges that there is no disc loaded, i.e., the state of "NO DISC", and brings the optical disc device to the state of waiting for a disc. (Step S15)

However, in case where a reduction in the AS signal amplitude and FE signal amplitude is caused by dusts and the like attached to the laser light source and a wrong judgement on the existence of a CD-R disc is made, the disc motor 13 may start to rotate while the short wavelength (650 nm) laser light source emitting light, resulting in massive destruction of the data recorded on the CD-R. In order to prevent this from occurring, i.e., to enhance the reliability of the aforementioned method of identification, the following method is allowed to be added.

Figure 6:
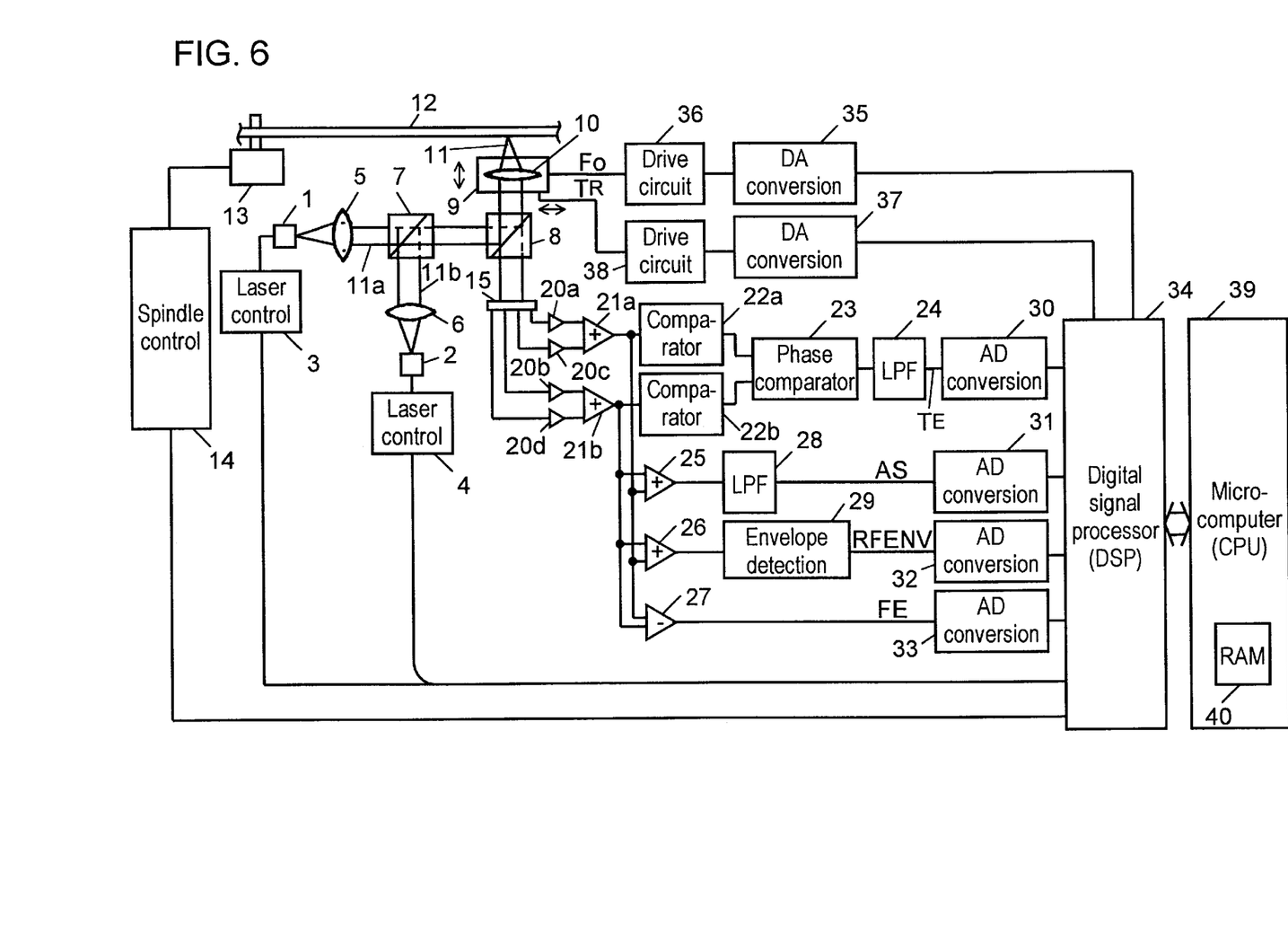
FIG. 6 is a block diagram of an optical disc unit employing a method for identifying discs in another exemplary embodiment of the present invention.

The optical disc device is provided with a microcomputer 39 as shown in FIG. 6, whereby the DSP 34 and the optical disc device are controlled according to its programs, and the detected all light amount sum signal AS and focus error signal FE are stored in its RAM 40. The disc identification method is performed as described in a flow chart of FIG. 7, in which a focus error signal FE is used to identify discs but the use of an all light amount sum signal AS can also achieve the same effect.

Figure 7:
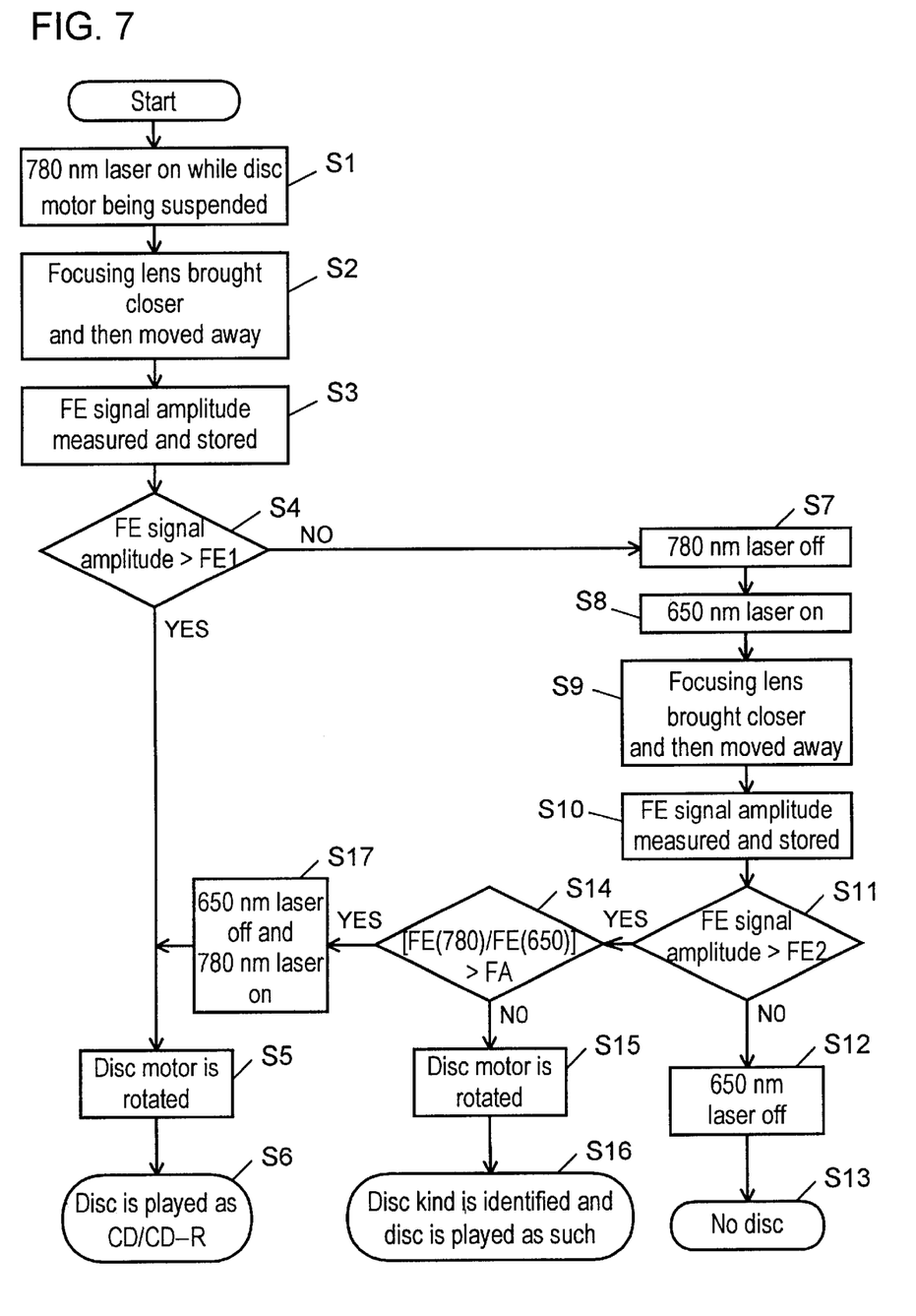
FIG. 7 is a flow chart for a case where a focus error signal FE is used in identifying discs of the optical disc unit of FIG. 6.

First, in Step S1, while the rotation of the disc being suspended, a signal is sent from the DSP 34 to the laser control circuit 3 to emit light from the long wavelength (780 nm) laser light source 1.

Next, in Step S2, the focusing lens 10 is brought closer to and then moved away from the disc. At this time, the amplitude values (max. value and min. value) of the focus error signal FE are fed into the DSP 34 through an AD converter 33 and then are outputted to the CPU 39 via a bus and the CPU 39 stores the foregoing inputted amplitude values of the focus error signal FE in its built-in RAM 40. (Step S3)

When the disc is recognized as being CD or CD-R as a result of comparing the foregoing focus error signals FE with the criterion of judgement FE1, the disc motor 13 is rotated and the optical disc device is put into operation by using CD or CD-R as the disc in the same manner as the identification method as described in the above. (Steps S4, S5 and S6)

When the disc is identified as being different from CD or CD-R, the focusing lens 10 is driven to the lowest position and then the long wavelength (780 nm) laser light source 1 is switched off. Instead, the short wavelength (650 nm) laser light 2 is switched on and the focusing lens 10 is brought closer to and then moved away from the disc. (Steps S7, S8 and S9)

Then, the amplitudes (max. value and min. value) of the focus error signal FE obtained by irradiating the short wavelength (650 nm) laser 2 on the disc are memorized in the RAM 40 built in the CPU 39. (Step 10)

When this focus error signal FE is compared with FE2 that makes a criterion of judgement for optical discs such as DVD-5, DVD-9 and the like (Step S11), if the focus error signal FE is smaller than FE2, the short wavelength (650 nm) laser light source is switched off (Step S12) with resulting judgement that there is no disc loaded. (Step S13)

If the focus error signal FE is larger than the value of FE2, the process moves to Step 14 and it is confirmed again whether the disc is CD-R or not. More specifically, a ratio of the focus error value FE(650) measured with the laser light of 650 nm in wavelength to the focus error value FE(780) measured with the laser light of 780 nm in wavelength is smaller than a predetermined value FA, and then the disc loaded can be judged as DVD-5 and DVD-9. In other words, when an inequality of FE(780)/FE(650)<FA is established, the disc is judged as being DVD-5 and DVD-9. Then, in Steps S15 and S16, the kind of the disc is identified and the optical disc device is put in operation.

If the afore-mentioned ratio is larger than FA, i.e., FE(780)/FE(650)>FA, which is caused by that FE(650) of CD-R is by far smaller than FE(650) of other discs, the disc loaded is judged as being CD-R.

When the disc is judged as being CD-R, after the short wavelength (650 nm) laser light source 2 is switched off while the disc motor 13 is not being rotated, light beam is emitted from the long wavelength (780 nm) laser light source 1 and the optical disc drive is put in operation with the disc loaded being taken as CD/CD-R. (Steps S17, S5 and S6)

Although the foregoing description is given to a method, in which each respective amplitude value of the signal is stored in the RAM 40 that is built in the CPU 39, the same data is allowed to be stored in the RAM that is built in the DSP when the capabilities of the DSP and the capacity of the RAM are large enough. When the data is too large to be stored in the built-in RAM, a RAM that is externally attachable and accessible from the DSP or the CPU may be provided.

Although the foregoing description is given to an example, in which two laser light sources of 780 nm and 650 nm in wavelength are used, laser light sources of more than two different wavelengths can also be employed according to the method as described in the above by switching the steps sequentially. Further, a laser light source of 650 nm or 635 nm in wavelength, and a blue laser light source of even a shorter wavelength are also allowed to be adopted with the same resulting effect. The present invention is not restricted whatsoever in the effectiveness thereof by the wavelength of laser light source to be employed.

Accordingly, even if a wrong judgement is made on the disc in use, a corrective measure can be taken by identifying the disc again, thereby enhancing the identification accuracy of discs remarkably.

INDUSTRIAL USABILITY

As described in the above, when a variety of discs such as CD, CD-R, CD-RW, DVD and the like are used for recording/reproducing information with an optical disc device, a method for identifying discs of the present invention enables data to be prevented from destruction, without irradiating laser light of such a short wavelength as 650 nm on a CD-R disc.

Even if short wavelength laser light has been irradiated on a disc by wrong identification of the disc, a confirmation as to whether or not the disc is CD-R and the like is allowed to be further carried out. At this time, the short wavelength laser light is irradiated on the disc while the disc being suspended in rotation, thereby enabling the data to be prevented from mass destruction. Further in this case, if the disc identification is performed by utilizing an area outside of the data area, there would not be any damages incurred in real terms. Thus, the present invention has the remarkable effect on enhanced versatility and the like of optical disc devices.

What is claimed is:

1. A method for identifying discs in an optical disc device, wherein the optical disc device contains a first light source operable to radiate a light beam with a first wavelength for reproducing information from a first optical disc, a second light source operable to radiate a light beam with a second wavelength which is shorter than the first wavelength for reproducing information from a second optical disc having a higher recording density than the recording density of the first optical disc, a convergent device operable to have the light beams of the first and second wavelengths converge on the optical disc, and a light receiving device operable to receive reflected light from the first and second optical discs, said method comprising:

irradiating the light beam of the first wavelength on an optical disc while rotation of the optical disc is suspended;

recognizing the existence of the first optical disc according to a signal received from the light receiving device when a focal point of the convergent device is moved in a light irradiating axis direction to the optical disc;

switching off the first light source and irradiating the light beam of the second wavelength on the optical disc while the rotation of the optical disc is still suspended when no existence of the first optical disc is recognized;

recognizing the existence of the second optical disc according to a signal received from the light receiving device when a focal point of the convergent device is moved in the light irradiating axis direction to the optical disc;

memorizing a signal received from the light receiving device when no existence of the first optical disc is recognized by irradiating the light beam of the first wavelength;

irradiating the light beam of the second wavelength in succession to memorize a signal received from the light receiving device to recognize the existence of the second disc; and judging the existence of the first optical disc again by making a comparison between the values of two memorized signals.

2. A method for identifying discs as claimed in claim 1, wherein:

said irradiating the light beam of the second wavelength is immediately stopped when it is judged in said judgement that the light beam of the second wavelength is erroneously irradiated on the first optical disc; and said irradiating the light beam of the second wavelength is immediately changed to that of the first wavelength and the optical disc device starts rotating and is operated with the disc loaded being taken as the first optical disc.

3. A method for identifying discs as claimed in claim 1, wherein the first optical disk comprises one of a CD, CD-R, and CD-RW and the second optical disk comprises one of a DVD-5 and DVD-9.

4. A method for identifying discs as claimed in claim 1, wherein the first wavelength is 780 nm and the second wavelength is 650 nm.

5. An optical disc device for identifying optical discs, said optical disc device comprising:

a first light source operable to radiate a light beam with a first wavelength for reproducing information from a first optical disc;

a second light source operable to radiate a light beam with a second wavelength which is shorter than the first wavelength for reproducing information from a second optical disc having a higher recording density than the recording density of the first optical disc;

a convergent device operable to have the light beams of the first and second wavelengths converge on the optical disc;

a light receiving device operable to receive reflected light from the first and second optical discs; and a digital signal processor operable to:

enable irradiation of the light beam of the first wavelength from said first light source to an optical disc while rotation of the optical disc is suspended;

enable a recognition of the existence of the first optical disc according to a signal received from said light receiving device when a focal point of said convergent device is moved in a light irradiating axis direction to the optical disc;

enable a switching off of said first light source and enable irradiation of the light beam of the second wavelength from said second light source to the optical disc while the rotation of the optical disc is still suspended when no existence of the first optical disc is recognized; and enable a recognition of the existence of the second optical disc according to a signal received from said light receiving device when a focal point of said convergent device is moved in the light irradiating axis direction to the optical disc;

enable a memorizing of a signal received from said light receiving device when no existence of the first optical disc is recognized by irradiating the light beam of the first wavelength;

enable irradiation of the light beam of the second wavelength in succession to memorize a signal received from said light receiving device to recognize the existence of the second disc; and enable a judgement on the existence of the first optical disc again by making a comparison between the values of two memorized signals.

6. An optical disc device as claimed in claimed in claim 5, wherein:

the irradiation of the light beam of the second wavelength from said second light source is immediately stopped when it is judged by said digital signal processor that the light beam of the second wavelength is erroneously irradiated on the first optical disc; and the irradiation of the light beam of the second wavelength is immediately changed to that of the first wavelength and said optical disc device starts rotating and is operated with the disc loaded being taken as the first optical disc.

7. An optical disc device as claimed in claim 5, wherein the first optical disk comprises one of a CD, CD-R, and CD-RW and the second optical disk comprises one of a DVD-5 and DVD-9.

8. An optical disc device as claimed in claim 5, wherein the first wavelength is 780 nm and the second wavelength is 650 nm.

* * * * *